(12) United States Patent
Oho et al.

(10) Patent No.: US 10,418,921 B2
(45) Date of Patent: Sep. 17, 2019

(54) MACHINE LEARNING DEVICE, SERVO MOTOR CONTROL DEVICE, SERVO MOTOR CONTROL SYSTEM, AND MACHINE LEARNING METHOD

(71) Applicant: FANUC CORPORATION, Yamanashi (JP)

(72) Inventors: Yusaku Oho, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/021,447

(22) Filed: Jun. 28, 2018

(65) Prior Publication Data

US 2019/0028043 A1   Jan. 24, 2019

(30) Foreign Application Priority Data

Jul. 18, 2017 (JP) .................. 2017-138949

(51) Int. Cl.
*H02P 6/08* (2016.01)
*H02P 6/17* (2016.01)
(Continued)

(52) U.S. Cl.
CPC .................. *H02P 6/08* (2013.01); *G05B 1/00* (2013.01); *G06N 20/00* (2019.01); *H02P 6/17* (2016.02);
(Continued)

(58) Field of Classification Search
CPC ............. H02P 23/0013; H02P 23/0018; H02P 23/0004; H02P 23/00; H02P 1/00;
(Continued)

(56) References Cited

U.S. PATENT DOCUMENTS 7,437,201 B2 * 10/2008 Cullen ................... G05B 17/02
700/29
8,786,219 B2 * 7/2014 Ikeda .................... H02P 29/032
242/334.1

FOREIGN PATENT DOCUMENTS

JP  2004-280565  10/2004
JP  2005-71034  3/2005
(Continued)

*Primary Examiner* — Antony M Paul
(74) *Attorney, Agent, or Firm* — Wenderoth, Lind & Ponack, L.L.P.

(57) ABSTRACT

A machine learning device is configured to perform machine learning with respect to a servo motor control device including a non-linear friction compensator that creates a compensation value with respect to non-linear friction on the basis of a position command, the machine learning device including: a state information acquisition unit configured to acquire state information including a servo state including position error, and combination of compensation coefficients of the non-linear friction compensation unit, by causing the servo motor control device to execute a predetermined program; an action information output unit configured to output action information including adjustment information of the combination of compensation coefficients; a reward output unit configured to output a reward value in reinforcement learning, based on the position error; and a value function updating unit configured to update an action value function on the basis of the reward value, the state information, and the action information.

9 Claims, 11 Drawing Sheets

(51) Int. Cl.
*G06N 20/00* (2019.01)
*G05B 1/00* (2006.01)
*H02P 21/08* (2016.01)
*H02P 23/00* (2016.01)

(52) U.S. Cl.
CPC .......... *H02P 21/08* (2013.01); *H02P 23/0031* (2013.01)

(58) Field of Classification Search
CPC .... H02P 1/04; H02P 1/166; H02P 1/24; H02P 1/46; H02P 1/465; H02P 6/00; H02P 6/008; H02P 6/04; H02P 6/08; H02P 21/00; H02P 21/001; H02P 21/0014; H02P 27/04; G05B 11/01; G05B 13/00; G05B 19/25; G05B 19/408; G05B 11/32; G05D 23/275
USPC ..... 318/560, 561, 568.22, 568.18, 571, 620, 318/625, 628, 632, 633, 638, 432, 434
See application file for complete search history.

(56) References Cited

FOREIGN PATENT DOCUMENTS

| | | |
|---|---|---|
| JP | 2010-9529 | 1/2010 |
| JP | 2013-3845 | 1/2013 |
| JP | 2015-18496 | 1/2015 |
| JP | 2016-101017 | 5/2016 |
| JP | 2017-33138 | 2/2017 |
| JP | 2017-102613 | 6/2017 |

\* cited by examiner $$f_{(\omega)} = f_{1(\omega)} + f_{2(\omega)}$$

$$f_{1(\omega)} = c \cdot \omega$$

$$f_{2(\omega)} = \begin{cases} d & (\omega > 0) \\ 0 & (\omega = 0) \\ -d & (\omega < 0) \end{cases}$$

BEFORE PARAMETER ADJUSTMENT

AFTER PARAMETER ADJUSTMENT

MACHINE LEARNING DEVICE, SERVO MOTOR CONTROL DEVICE, SERVO MOTOR CONTROL SYSTEM, AND MACHINE LEARNING METHOD

This application is based on and claims the benefit of priority from Japanese Patent Application No. 2017-138949, filed on 18 Jul. 2017, the content of which is incorporated herein by reference.

BACKGROUND OF THE INVENTION

Field of the Invention

The present invention relates to: a machine learning device that performs learning related to compensation coefficients in compensation of nonlinear friction, with respect to a servo motor control device that performs compensation to the nonlinear friction; the servo motor control device and a servo motor control system including the machine learning device; and a machine learning method.

Related Art

As conventional servo motor control devices, for example, a motor control device disclosed in Patent Document 1, a servo control device disclosed in Patent Document 2, and a motor control device disclosed in Patent Document 3 are known.

The motor control device disclosed in Patent Document 1 has: a velocity feedforward control unit that generates a velocity feedforward command for reducing position error on the basis of a position command; and a torque feedforward control unit that generates a torque feedforward command for reducing the position error on the basis of the position command.

The servo control device disclosed in Patent Document 2 has a feedforward compensator that generates a feedforward command on the basis of a position command. The servo control device disclosed in Patent Document 2 has a friction compensation device for compensating control error due to influence of friction in a machine tool.

The motor control device disclosed in Patent Document 3 has a compensation calculation unit for compensating stick motions on the basis of a friction torque estimated by disturbance observer and a torque command, and compensating lost motions on the basis of a velocity command.

Patent Document 1: Japanese Unexamined Patent Application, Publication No. 2016-101017
Patent Document 2: Japanese Unexamined Patent Application, Publication No. 2015-018496
Patent Document 3: Japanese Unexamined Patent Application, Publication No. 2004-280565

SUMMARY OF THE INVENTION

As a factor of control error at the time of inversion motion of a servo motor in a servo motor control device, response delay of a servo system, elastic deformation of a machine system, and influence of friction are considered. The control error is greatly influenced by, particularly, non-linear friction among frictions. Compensating non-linear friction is important in servo performance improvement. An object of the present invention is to provide: a machine learning device that performs compensation of non-linear friction to improve responsiveness of a servo system at the time of inversion motion of a servo motor; a servo motor control device; a servo motor control system; and a machine learning method.

(1) A machine learning device (for example, a machine learning device 200 described later) according to the present invention is configured to perform machine learning with respect to a servo motor control device (for example, a servo motor control device 100 described later) including a non-linear friction compensation unit (for example, a non-linear friction compensator 111 described later) configured to create a compensation value with respect to non-linear friction on the basis of a position command, and the machine learning device includes:

a state information acquisition unit (for example, a state information acquisition unit 201 described later) configured to acquire state information from the servo motor control device by causing the servo motor control device to execute a predetermined program, the state information including a servo state including at least position error, and combination of compensation coefficients of the non-linear friction compensation unit;

an action information output unit (for example, an action information output unit 203 described later) configured to output action information including adjustment information of the combination of the compensation coefficients included in the state information, to the servo motor control device; a reward output unit (for example, a reward output unit 2021 described later) configured to output a reward value in reinforcement learning, based on the position error included in the state information; and a value function updating unit (for example, a value function updating unit 2022 described later) configured to update an action value function on the basis of the reward value output by the reward output unit, the state information, and the action information.

(2) In the machine learning device according to (1) described above, the reward output unit may output the reward value on the basis of an absolute value of the position error.

(3) In the machine learning device according to (1) or (2) described above, the servo motor control device may further comprise a velocity feedforward calculation unit (for example, a velocity feedforward calculation unit 110 described later) configured to create a velocity feedforward value on the basis of the position command, and the non-linear friction compensation unit may be connected in parallel to the velocity feedforward calculation unit.

(4) In the machine learning device according to any of (1) to (3) described above, the machine learning device may further include an optimizing action information output unit (for example, an optimizing action information output unit 205 described later) configured to generate and output combination of compensation coefficients of the non-linear friction compensation unit, on the basis of a value function updated by the value function updating unit.

(5) A servo motor control system according the present invention is a servo motor control system including: the machine learning device (for example, a machine learning device 200 described later) according to any of (1) to (4) described above; and a servo motor control device (for example, a servo motor control device 100 described later) that comprise a non-linear friction compensation unit configured to create a compensation value with respect to non-linear friction.

(6) In the servo motor control system according to (5) described above, the servo motor control device may further comprise a velocity feedforward calculation unit (for example, a velocity feedforward calculation unit 110 described later) configured to create a velocity feedforward value on the basis of a position command, and the non-linear friction compensation unit may be connected in parallel to a velocity feedforward calculation unit.

(7) A servo motor control device according to the present invention is a servo motor control device including the machine learning device according to any of (1) to (4) described above, and a non-linear friction compensation unit configured to create a compensation value with respect to non-linear friction.

(8) The servo motor control device according to (7) described above, the servo motor control device may further include a velocity feedforward calculation unit configured to create a velocity feedforward value on the basis of a position command, and the non-linear friction compensation unit may be connected in parallel to a velocity feedforward calculation unit.

(9) A machine learning method according to the present invention is a machine learning method of a machine learning device (for example, a machine learning device 200 described later) configured to perform machine learning with respect to a servo motor control device (for example, a servo motor control device 100 described later), including a non-linear friction compensation unit (for example, a non-linear friction compensator 111 described later) configured to create a compensation value with respect to non-linear friction on the basis of a position command, the machine learning method including:

acquiring state information from the servo motor control device by causing the servo motor control device to execute a predetermined program, the state information including a servo state including at least position error, and a combination of compensation coefficients of the non-linear friction compensation unit;

outputting action information including adjustment information of the combination of compensation coefficients included in the state information, to the servo motor control device; and updating action value function on the basis of a reward value in reinforcement learning, the state information, and the action information based on the position error included in the state information.

According to the present invention, responsiveness of a servo system at the time of inversion motion of a servo motor can be improved by compensating of non-linear friction.

DETAILED DESCRIPTION OF THE INVENTION

Embodiments of the present invention will be described in detail below with reference to drawings.

First Embodiment

Figure 1:
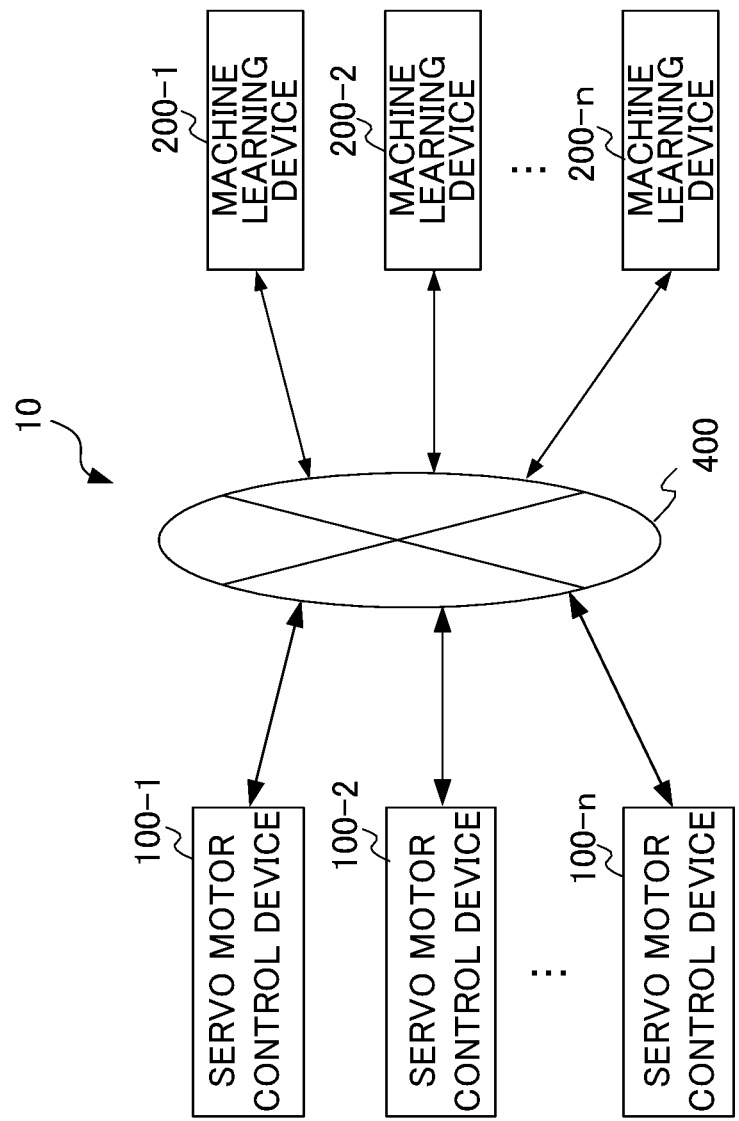
FIG. 1 is a block diagram showing a servo motor control system of a first embodiment of the present invention.

FIG. 1 is a block diagram showing a servo motor control system of a first embodiment of the present invention. As shown in FIG. 1, a servo motor control system 10 includes n servo motor control devices 100-1 to 100-n, n machine learning devices 200-1 to 200-n, and a network 400. Note that n is an arbitrary natural number.

The servo motor control device 100-1 and the machine learning device 200-1 are considered to be a set of one-to-one, and are communicatively connected. The servo motor control devices 100-2 to 100-n and the machine learning devices 200-2 to 200-n are connected as similar to the servo motor control device 100-1 and the machine learning device 200-1. In FIG. 1, n sets of the servo motor control devices 100-1 to 100-n and the machine learning devices 200-1 to 200-n are connected via the network 400. However, for the n sets of the servo motor control devices 100-1 to 100-n and the machine learning devices 200-1 to 200-n, the servo motor control devices and the machine learning devices in each of the sets may be directly connected via a connection interface. A plurality of n sets of these servo motor control devices 100-1 to 100-n, and the machine learning devices 200-1 to 200-n may be, for example, installed in the same factory, or may be installed in different factories.

The network 400 is, for example, a local area network (LAN) constructed in a factory, the Internet, a public telephone network, a direct connection via a connection interface, or combination thereof. Particular communication method in the network 400, which of wired connection and wireless connection is used, and the like, are not limited particularly.

Figure 2:
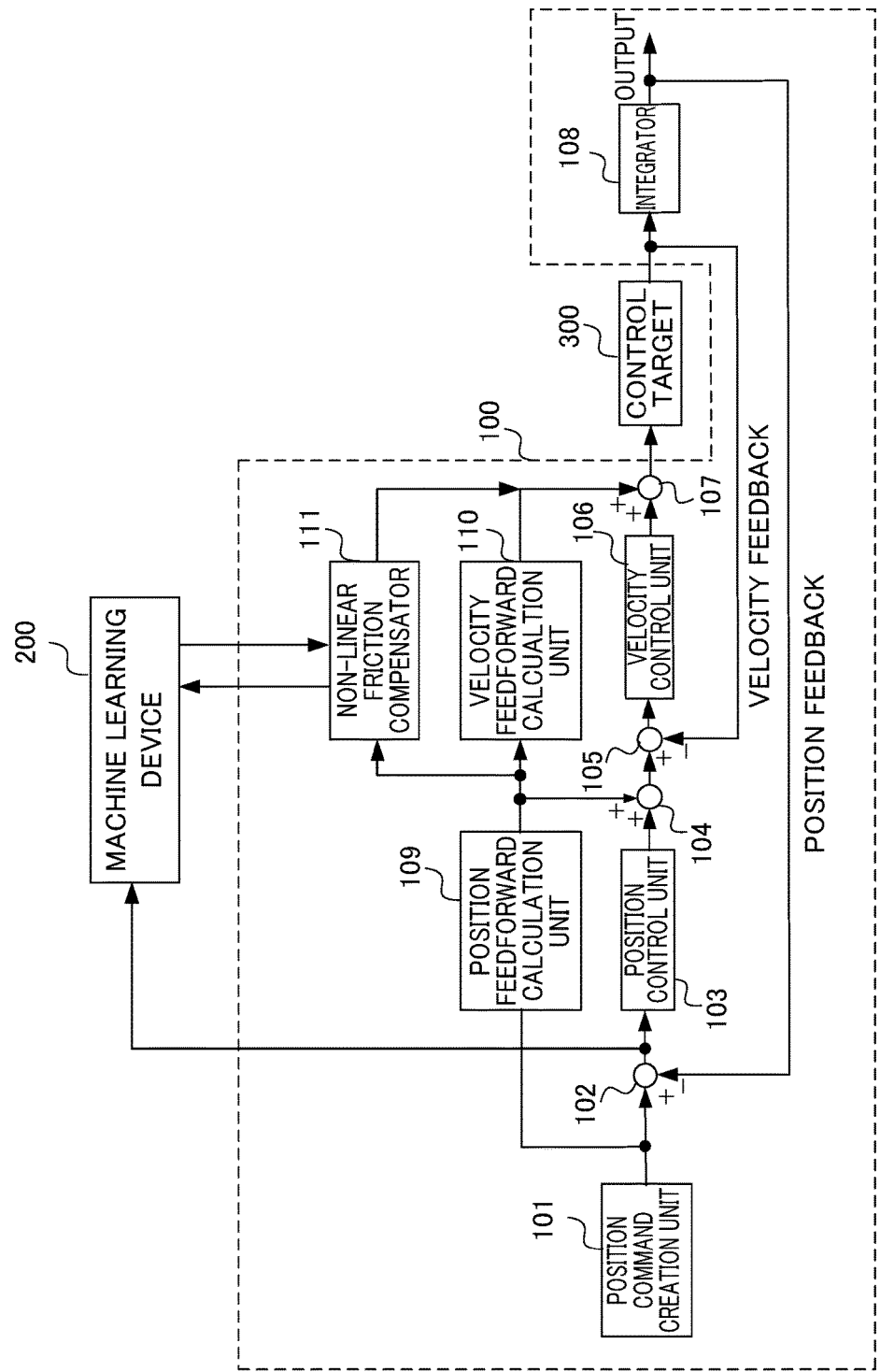
FIG. 2 is a block diagram showing a set of a servo motor control device of the servo motor control system and a machine learning device, and a control target, of the first embodiment of the present invention.

FIG. 2 is a block diagram showing a set of a servo motor control device of the servo motor control system and a machine learning device, and a control target, of the first embodiment of the present invention. The servo motor control device 100 and the machine learning device 200 in FIG. 2 correspond to, for example, the servo motor control device 100-1 and the machine learning device 200-1 shown in FIG. 1. A control target 300 is, for example, a machine tool, a robot, an industrial machine, or the like including the servo motor. The servo motor control device 100 may be provided as a part of a machine tool, a robot, an industrial machine, or the like.

First, the servo motor control device 100 will be described. As shown in FIG. 2, the servo motor control device 100 includes a position command creation unit 101, a subtractor 102, a position control unit 103, an adder 104, a subtractor 105, a velocity control unit 106, an adder 107, an integrator 108, a position feedforward calculation unit 109, a velocity feedforward calculation unit 110, and a non-linear friction compensator 111.

The position command creation unit 101 creates a position command value for operating the servo motor included in the control target 300, in accordance with a program input from a host control device, an external input device, or the like not shown, to output the created position command value to the subtractor 102, and the position feedforward calculation unit 109. The subtractor 102 determines a difference between the position command value and a detected position obtained by position feedback, to output the difference to the position control unit 103, as position error, and transmit the difference to the machine learning device 200. The position command creation unit 101 creates the position command value on the basis of a program that operates the servo motor included in the control target 300. The control target 300 is, for example, a machine tool including the servo motor. When the machine tool moves a table mounted with a workpiece in an X axis direction and a Y axis direction, and machines the workpiece, the servo motor control device shown in FIG. 2 is provided with respect to each of the X axis direction and the Y axis direction. When the machine tool moves the table in directions of three or more axes, the servo motor control device shown in FIG. 2 is provided with respect to each of the axis directions. The position command creation unit 101 creates the position command value by changing a pulse frequency so that a geometry specified by the program is obtained, and a speed of the servo motor is changed.

For example, the position control unit 103 outputs to the adder 104 a value obtained by multiplying a position gain Kp that is set in advance to, the position error, as a velocity command value. The position feedforward calculation unit 109 outputs to the adder 104, the velocity feedforward calculation unit 110, and the non-linear friction compensator 111, a value obtained by differentiating the position command value and multiplying a feedforward coefficient.

The adder 104 adds the velocity command value, and an output value of the position feedforward calculation unit 109, to output to the subtractor 105, the obtained value as a feedforward controlled velocity command value. The subtractor 105 determines difference between an output of the adder 104, and the velocity detection value obtained by velocity feedback, to output the difference as velocity error, to the velocity control unit 106.

For example, the velocity control unit 106 adds a value obtained by multiplying an integral gain K1v that is set in advance, to the velocity error and integrating, with a value obtained by multiplying a proportional gain K2v that is set in advance, to the velocity error, to output an obtained value as a torque command value, to the adder 107.

The velocity feedforward calculation unit 110 performs velocity feedforward calculation processing represented by a transfer function Gf(S) represented by, for example, formula 1 (shown as formula 1 below), on the basis of the output value of the position feedforward calculation unit 109 to output a calculation result to the adder 107 as a first torque compensation value. Coefficients $a_i$, $b_j$ of the velocity feedforward calculation unit 110 are constants that are set in advance so that $0 \le i \le m$ for $a_i$ and $0 \le j \le n$ for $b_j$ are satisfied. The dimensions m, n are natural numbers which are set in advance.

$$Gf(s) = \frac{b_0 + b_1 s + b_2 s^2 + \cdots}{a_0 + a_1 s + a_2 s^2 + \cdots} \quad \text{[Formula 1]}$$

Figure 3:
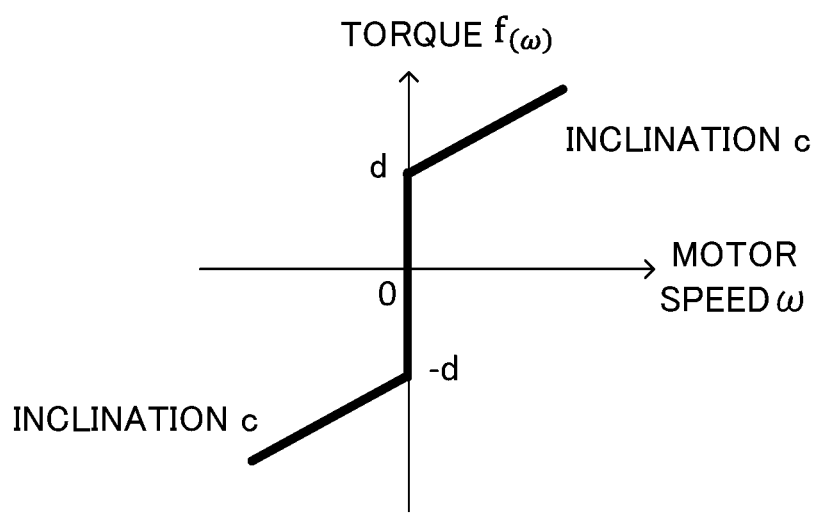
FIG. 3 is a characteristic diagram showing a relationship between a non-linear friction compensation value f(ω) and a motor speed w.

The non-linear friction compensator 111 determines a non-linear friction compensation value for compensating non-linear friction generated in the control target 300 on the basis of an output value of the position feedforward calculation unit 109, and outputs the non-linear friction compensation value to the adder 107 as a second torque compensation value. The non-linear friction is, for example, mainly generated by a ball screw, or the like of a machine tool that is other than the servo motor, when the control target 300 is the machine tool including the servo motor. However, the non-linear friction is generated also in the servo motor. A non-linear friction compensation value f(ω) is shown by, for example, formula 2 (shown as formula 2 below), and can be determined by using a motor speed ω. FIG. 3 is a characteristic diagram showing a relationship between a non-linear friction compensation value f(ω) and a motor speed ω.

$$f_{(\omega)} = f_{1(\omega)} + f_2(\omega) \quad \text{[Formula 2]}$$
$$f_{1(\omega)} = c \cdot \omega$$
$$f_2(\omega) = \begin{cases} d & (\omega > 0) \\ 0 & (\omega = 0) \\ -d & (\omega < 0) \end{cases}$$

As described later, optimal values of combination of compensation coefficients c, d in formula 2 are determined by using the machine learning device 200.

The adder 107 adds the torque command value, the output value of the velocity feedforward calculation unit 110, and the output value of the non-linear friction compensator 111, to output an obtained value to a servo motor of the control target 300 as a feedforward controlled torque command value.

The control target 300 outputs a velocity detection value, and the velocity detection value is input to the subtractor 105, as the velocity feedback. The velocity detection value is integrated by the integrator 108 to be a position detection value. The position detection value is input to the subtractor 102, as position feedback. The servo motor control device 100 is configured as described above.

Figure 4:
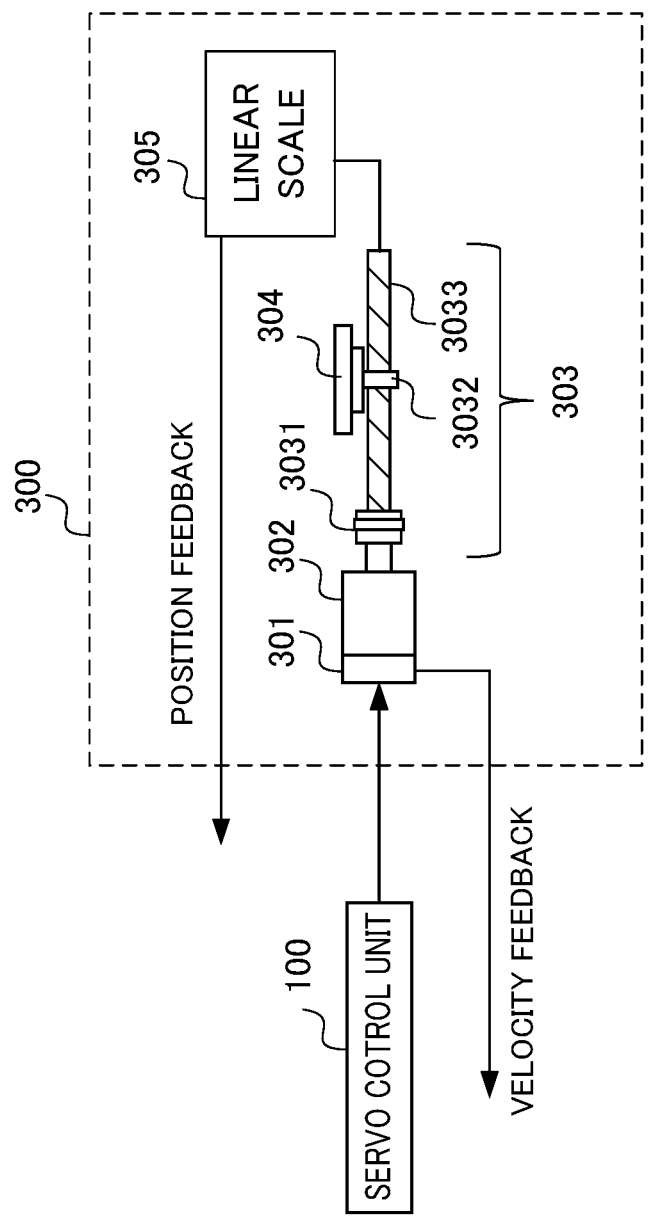
FIG. 4 is a block diagram showing an example of a control target.

Next, the control target 300 that is controlled by the servo motor control device 100, will be described. FIG. 4 is a block diagram showing part of a machine tool including the servo motor, as an example of the control target 300. The servo motor control device 100 moves a table 304 via a coupling mechanism 303 in a servo motor 302. The machine tool rotates a spindle attached with a tool while moving the table 304, to machine a workpiece mounted on the table 304. The coupling mechanism 303 has a coupling 3031 coupled to the servo motor 302, and a ball screw 3033 fixed to the coupling 3031. A nut 3032 is screwed into the ball screw 3033. The nut 3032 screwed into the ball screw 3033 is moved in an axis direction of the ball screw 3033, by rotation drive of the servo motor 302. The non-linear friction is generated in the coupling mechanism 303 including the coupling 3031 and the ball screw 3033, the nut 3032, and the like. However, the non-linear friction is generated also in the servo motor 302.

A rotation angle position of the servo motor 302 is detected by a rotary encoder 301 that is a position detection unit, associated with the servo motor 302. A detected signal is utilized as the velocity feedback. The detected signal is integrated by the integrator 108 to be utilized as the position feedback. The machine tool may include a linear scale 305 that detects a moving distance of the ball screw 3033, in an end portion of the ball screw 3033. An output of the linear scale 305 can be used as the position feedback.

<Machine Learning Device 200>

Figure 5:
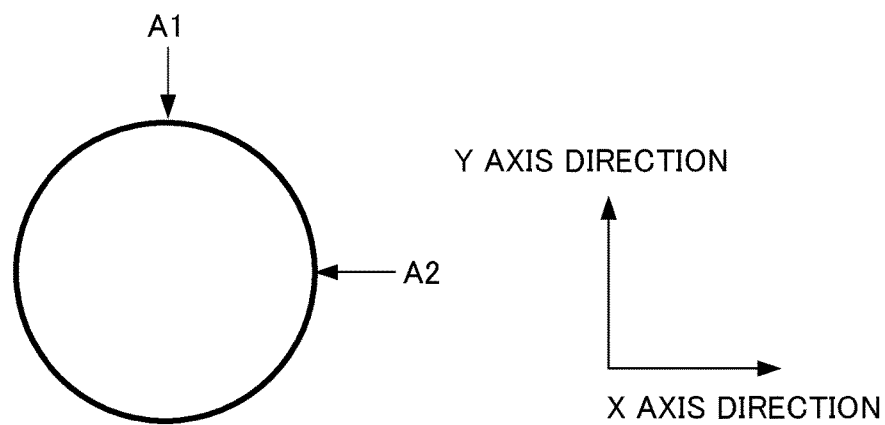
FIG. 5 is a diagram for explaining motion of a servo motor of when a geometry is a circle.
Figure 6:
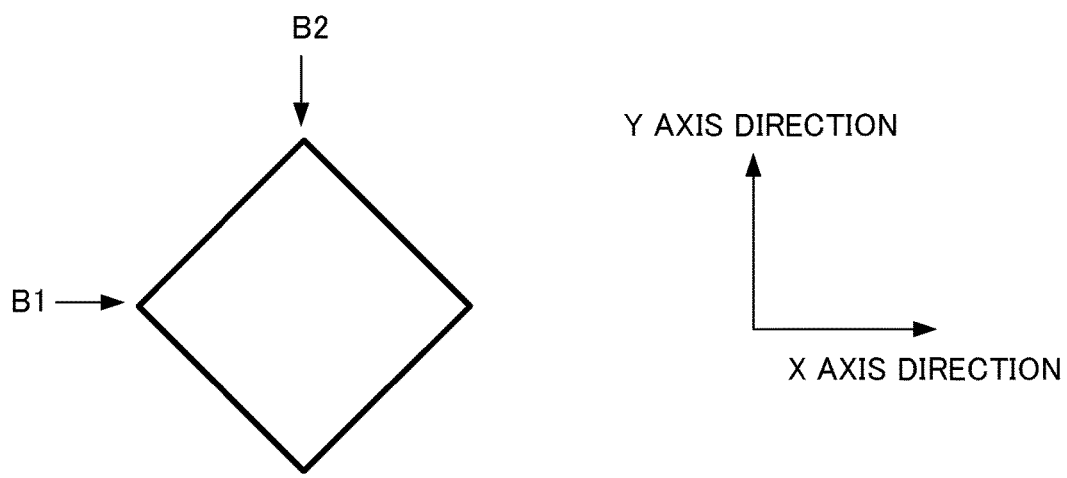
FIG. 6 is a diagram for explaining motion of the servo motor of when the geometry is a square.

The machine learning device 200 performs a preset evaluation program (hereinafter, also referred to as an "evaluation program") to learn the compensation coefficients of the non-linear friction compensator 111. When the machine tool machines by moving the table in the X axis direction and the Y axis direction by the servo motor, a geometry specified by the evaluation program may be, for example, a circle, a square, or a star-shape when the inversion motion of the servo motor is evaluated. FIG. 5 is a diagram for explaining motion of the servo motor when the geometry is a circle. FIG. 6 is a diagram for explaining motion of the servo motor when the geometry is a square. In FIG. 5 and FIG. 6, the table moves so that the workpiece is machined in a clockwise direction.

Figure 7:
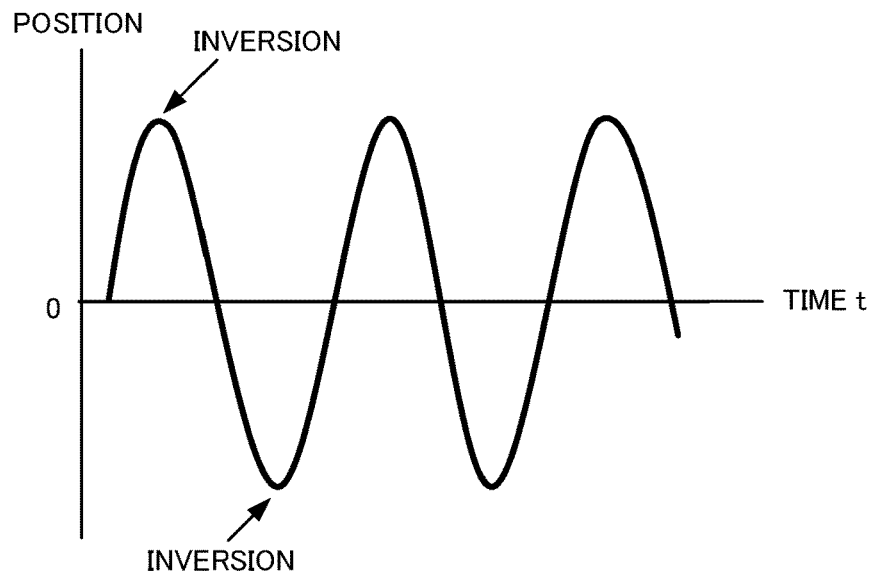
FIG. 7 is a diagram showing a state where a table included in the control target moves sinusoidally in an X axis direction or a Y axis direction.
Figure 8:
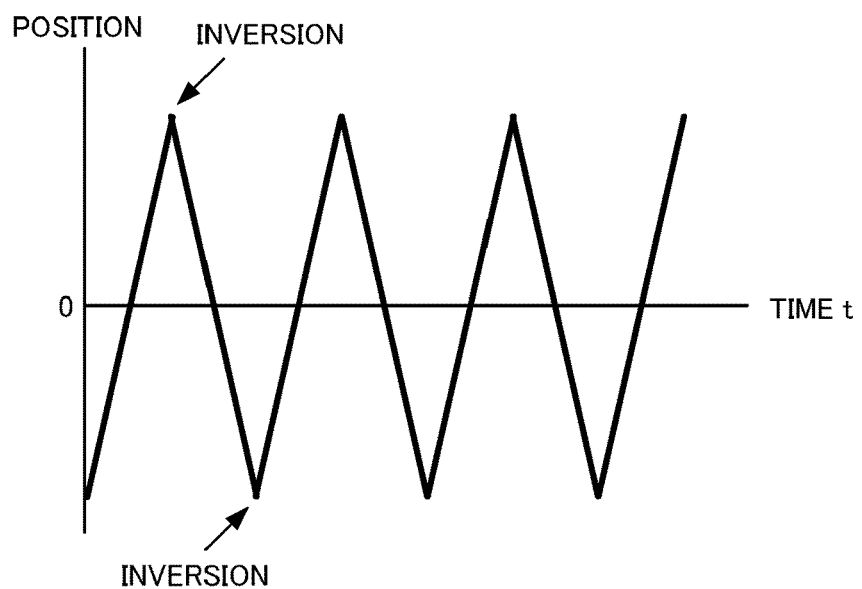
FIG. 8 is a diagram showing a state where the table included in the control target moves in triangular-wave shape, in the X axis direction or the Y axis direction.

When the inversion motion of the servo motor is evaluated, for example, as shown in FIG. 7 or FIG. 8, the servo motor control device 100 controls the servo motor 302 so that the table included in the control target 300 moves in a sine wave shape or triangular-wave shape in at least one direction of the X axis direction and the Y axis direction. The evaluation program controls the frequency of the pulse output from the position command creation unit 101 of the servo motor control device 100. This frequency controlling, a feed rate of the X axis direction or the Y axis direction of the table is controlled. When the frequency of the pulse output from the position command creation unit 101 becomes high, rotation speed of the motor increases, and the feed rate increases. On the other hand, when the frequency of the pulse becomes low, the rotation speed of the pulse decreases, and the feed rate decreases. When the rotation direction of the servo motor 302 inverts, the movement direction of the table inverts in the X axis direction or the Y axis direction.

When the geometry is a circle shown in FIG. 5, the servo motor control device 100 controls the servo motor of the X axis direction and the Y axis direction so that the table moves in a sine wave shape in the X axis direction as shown in FIG. 7, and moves in a cosine-wave shape in the Y axis direction. At a position A1 shown in FIG. 5, the rotation direction of the servo motor that moves the table in the Y axis direction inverts, and the table moves so as to linearly invert in the Y axis direction. On the other hand, at the position A1, the servo motor that moves the table in the X axis direction rotates at the same speed as speeds of before and after the position A1, and the table moves at the same speed as the speeds of before and after the position A1 in the X axis direction. The position A1 in which the table inverts in the Y axis direction corresponds to an inversion position of a positive direction shown in FIG. 7. On the other hand, the table that moves at a constant speed in the X axis direction, moves so that a phase of a wave form (sine wave shape) becomes a wave form (cosine wave) that is delayed or advances by 90 degrees. The position A1 in which the table moves at a constant speed in the X axis direction corresponds to an intermediate position between an inversion position of the positive direction and an inversion position of a negative direction, shown in FIG. 7. At a position A2 shown in FIG. 5, the servo motor control device 100 controls each servo motor so that the motion of the servo motor that moves the table in the X axis direction, and the motion of the servo motor that moves the table in the Y axis direction are opposite from the position A1. That is, at the position A2, the rotation direction of the servo motor that moves the table in the X axis direction inverts, and the table moves so as to linearly invert in the X axis direction. On the other hand, at the position A2, the servo motor that moves the table in the Y axis direction rotates at the same speed as speeds of before and after the position A2, and the table moves at the same speed as speeds of before and after the position A2 in the Y axis direction.

When the geometry is a square shown in FIG. 6, the servo motor control device 100 controls the servo motor of the X axis direction and the Y axis direction so that the table moves in a triangular-wave shape in the X axis direction as shown in FIG. 8, and a phase of a triangular wave shown in FIG. 8 moves in a triangular-wave shape that is delayed or advances by 90 degrees, in the Y axis direction. When the table moves in the triangular-wave shape, the rotation speed of the servo motor from a positive inversion position to a negative inversion position, and from the negative inversion position to the positive inversion position, is constant. At a position B1 shown in FIG. 6, the rotation direction of the servo motor that moves the table in the X axis direction inverts, and the table moves so as to linearly invert in the X axis direction. On the other hand, at the position B1, the servo motor that moves the table in the Y axis direction rotates at a constant speed, and the table moves in the Y axis direction at the constant speed. The position B1 in which the table inverts in the X axis direction corresponds to an inversion position of the negative direction shown in FIG. 8. On the other hand, the table that moves in the Y axis direction at a constant speed, moves so that the phase of the triangular wave shown in FIG. 8 moves in a triangular-wave shape that is delayed or advances by 90 degrees. The position B1 in which the table moves at a constant speed in the Y axis direction corresponds to an intermediate position between the inversion position of the positive direction and the inversion position of the negative direction, shown in FIG. 8. At a position B2 shown in FIG. 6, the servo motor control device 100 controls each servo motor so that the motion of the servo motor that moves the table in the X axis direction, and the motion of the servo motor that moves the table in the Y axis direction are opposite from the position B1. That is, at the position B2, the rotation direction of the servo motor that moves the table in the Y axis direction inverts, and the table moves so as to linearly invert in the Y axis direction. On the other hand, at the position B2, the servo motor that moves the table in the X axis direction rotates at a constant speed, and the table moves in the X axis direction at a constant speed.

When the evaluation program is executed, the position command creation unit 101 of the servo motor control device 100 outputs the position command value so that the geometry is a circle, or a square, sequentially. The position command creation unit 101 changes the feed rate for every geometry that is a circle or a square, so that the machine learning device 200 can learn the influence on a plurality of feed rates. The position command creation unit 101 may change the feed rate in a middle of moving of a shape of the geometry, for example, when the table passes a corner in moving the table into a square geometry. Thereby, when the table moves in a sine-wave shape or a triangular-wave shape in the X axis direction or the Y axis direction, respectively, the machine learning device 200 can make a frequency high, or learn a pattern of gradually increasing a frequency.

Figure 9:
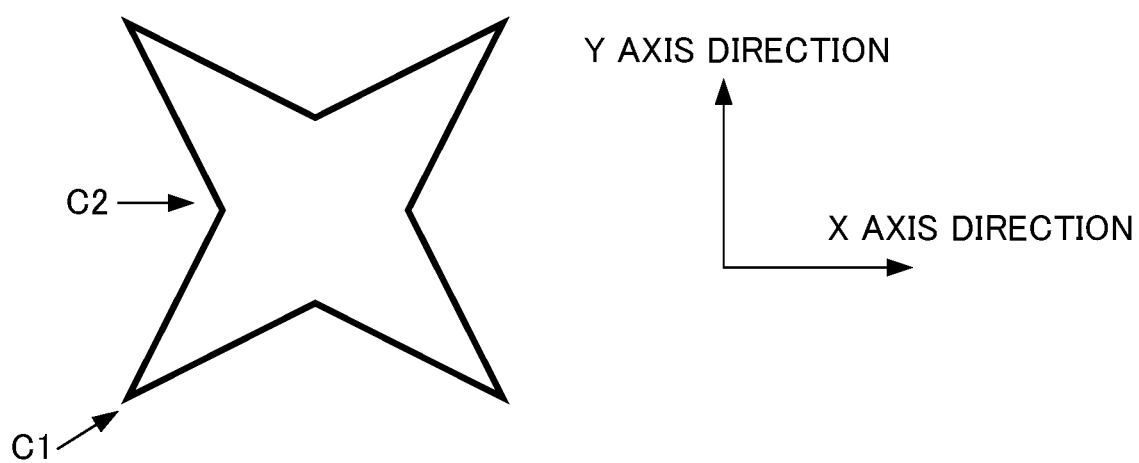
FIG. 9 is a diagram for explaining motion of the servo motor of when the geometry is a star shape.

When the geometry is a circle or a square, when the rotation direction of one servo motor of the servo motors that move the table in the X axis direction and the Y axis direction rotates, the other servo motor rotates at a constant speed. However, the geometry specified by the evaluation program may be a geometry, for example, a star shape as shown in FIG. 9, with which both the rotation directions of two servo motors that move the table in the X axis direction and the Y axis direction invert. The machine learning device 200 may learn combination of the compensation coefficients c, d of the non-linear friction compensator 111 in such geometry.

FIG. 9 is a diagram for explaining motion of the servo motor of when the geometry is a star shape. When the geometry is a star shape as shown in FIG. 9, the servo motor control device 100 controls the servo motors of the X axis direction and the Y axis direction so that the table moves in a triangular-wave shape in the X axis direction and the Y axis direction, in a projection portion of four "<" shapes of the star shape. At a vertex of the projection portion of the four "<" shapes of the star shape, for example, a position C1 shown in FIG. 9, the rotation direction of the servo motor that moves the table in the X axis direction inverts, and the table moves so as to linearly invert in the X axis direction. Similarly, at the position C1, the rotation direction of the servo motor that moves the table in the Y axis direction inverts, and the table moves so as to linearly invert in the Y axis direction. Accordingly, the inversion motion of the servo motor of when both the rotation directions of the two servo motors that move the table in the X axis direction and the Y axis direction invert is evaluated.

In the geometry of the star shape shown in FIG. 9, in a vertex of four concaved portions, as similar to when the geometry is a square shown in FIG. 6, the motion of when the rotation direction of the servo motor that moves in one direction of the X axis direction and the Y axis direction inverts, and the servo motor that moves in the other direction rotates at a constant speed, is evaluated. For example, at the position C2 shown in FIG. 9, the rotation direction of the servo motor that moves the table in the X axis direction inverts, and the table moves so as to linearly invert in the X axis direction. However, at the position C2, the servo motor that moves the table in the Y axis direction rotates at a constant speed, and the table moves in the Y axis direction at a constant speed.

Next, a configuration of the machine learning device 200 will be described. The machine learning device 200 learns combination of the compensation coefficients c, d of the non-linear friction compensator 111 for reducing position error of when the control target 300 is driven on the basis of the evaluation program.

Before each function block included in the machine learning device 200 is described, first, the basic mechanism of the reinforcement learning will be described. An agent (corresponding to the machine learning device 200 in the present embodiment) observes an environmental state, and selects one action. Then, the environment changes on the basis of the action. The agent calculates some rewards according to the environmental change, to learn selection (decision) of better action. While learning with a teacher presents a complete correct, the reward in the reinforcement learning often presents a fragmental value based on change of part of the environment. Thus, the agent learns to select an action so that the total reward in the future is the maximum.

In this way, in the reinforcement learning, by learning an action, the machine learning device 200 learns a suitable action in consideration of the mutual effect of the action with the environment, that is, an action for maximizing the reward to be obtained in the future. This represents that, in the present embodiment, the machine learning device 200 gains an action that affects the future, for example, selecting action information for reducing position error.

As the reinforcement learning, an arbitrary learning method is used. In the description below, a case where Q-learning is used will be described as an example. The Q-learning is a method of learning a value function Q (S, A) of selecting an action A, under an environmental state S. An object of the Q-learning is to select the action A having the highest value function Q (S, A) as a suitable action, from among actions A that can be taken, in a state S.

However, at the time when the Q-learning is performed for the first time, for combination of the state S and the action A, the correct value of the value function Q (S, A) is not identified at all. Thus, the agent selects various actions A under a state S, and with respect to the action A at that time, selects a better action on the basis of the given reward, to learn the correct value Q (S, A).

The Q-learning tries to finally obtain Q (S, A)=E[Σ(γ$^t$)r$_t$], in order to maximize the total reward that can be obtained in the future. E[ ] represents an expected value, t represents time, γ represents a parameter called a discount rate described later, r$_t$ is a reward at the time t, and Σ represents the total by the time t. The expected value in this formula is an expected value in a case where the state is changed according to the suitable action. However, the suitable action is not clear in a process of the Q-learning. Thus, the agent takes various actions to perform the reinforcement learning while searching. An updating formula of such value function Q (S, A) can be represented by, for example, the following formula 3 (shown as formula 3 below).

$$Q(S_{t+1}, A_{t+1}) \leftarrow Q(S_t, A_t) + \alpha \left( r_{t+1} + \gamma \max_A Q(S_{t+1}, A) - Q(S_t, A_t) \right)$$ [Formula 3]

In the formula 3 described above, $S_t$ represents an environmental state at the time t, and $A_t$ represents an action at the time t. The state is changed to $S_{t+1}$ by the action $A_t$. $r_{t+1}$ represents reward obtained by the state change. An item added with max is obtained by multiplying γ to the Q value of when the action A having the highest Q value that has been identified at that time, is selected, under the state $S_{t+1}$. The γ is a parameter of 0<γ≤1, and is called a discount rate. α is a learning coefficient, and is in a range of 0<α≤1.

The formula 3 described above represents a method of updating the value function Q ($S_t$, $A_t$) of the action $A_t$ in the state $S_t$, on the basis of the reward $r_{t+1}$ sent back as a result of the action $A_t$. This updating formula represents that the Q ($S_t$, $A_t$) is set to be large when a value max$_a$ Q($S_{t+1}$, A) of the best action in the next state $S_{t+1}$ by the action $A_t$ is larger than the value Q ($S_t$, $A_t$) of the action $A_t$ in the state $S_t$, while, the Q ($S_t$, $A_t$) is set to be small when the value max$_a$ Q($S_{t+1}$, A) of the best action in the next state $S_{t+1}$ by the action $A_t$ is smaller. That is, the updating formula represents that a value in an action in a state is approximated to a value of the best action in the next state by the action. Difference between them changes depending on the discount rate γ and the reward $r_{t+1}$. However, basically, mechanism is such that a value of the best action in a state is propagated to a value of an action in a state that is one before that state.

In the Q-learning, there is a method of learning by creating a table of the value function Q (S, A) for every state action pair (S, A). However, when the values of the value function Q (S, A) of all state action pairs are determined, the number of states is too large, and there is a case where much time is required for settling the Q-learning.

Thus, the Q-learning may utilize a known technique called a Deep Q-Network (DQN). Particularly, the Q-learning may configure a value function Q by using an appropriate neural network, and adjust a parameter of the neural network, to approximate the value function Q by the appropriate neural network, to calculate the value of the value function Q (S, A) By utilizing the DQN, the time required for settling the Q-learning can be shorten. The DQN is described in detail, for example, in Non-Patent Document below.

Non-Patent Document

"Human-level control through deep reinforcement learning", Volodymyr Mnihl [online], [searched on Jan. 17, 2017], Internet <URL: http://files.davidqiu.com/research/nature14236.pdf>

The Q-learning described above is performed by the machine learning device 200. Particularly, the machine learning device 200 learns the value function Q of selecting adjustment of the compensation coefficients c, d of the non-linear friction compensator 111 related to a state S, as the action A by setting values of the compensation coefficients c, d of the non-linear friction compensator 111 in the servo motor control device 100, and a servo state such as a command and feedback to be the state S. The servo state includes position error information of the servo motor control device 100 acquired by executing the evaluation program.

The machine learning device 200 observes the state information S including a servo state such as a command and feedback, including the position error information of the servo motor control device 100 acquired by executing the evaluation program on the basis of the compensation coefficients c, d of the non-linear friction compensator 111, to determine the action A. The machine learning device 200 gives a reward every time the action A is performed. The machine learning device 200, for example, searches an optimal action A so that the total reward in the future is the maximum, through trial and error. By that, the machine learning device 200 can select the optimal action A (that is, the optimal compensation coefficients c, d of the non-linear friction compensator 111) with respect to the state S including the servo state such as a command and feedback, including the position error information of the servo motor control device 100 obtained by executing the evaluation program on the basis of the compensation coefficients c, d of the non-linear friction compensator 111.

That is, the machine learning device 200 selects the action A with which the value of the value function Q learned by the machine learning device 200 is the maximum, from among the actions A applied to the compensation coefficients c, d of the non-linear friction compensator 111 related to a state S, to select the action A with which the position error obtained by executing the evaluation program is the minimum (that is, the combination of the compensation coefficients c, d of the non-linear friction compensator 111).

Figure 10:
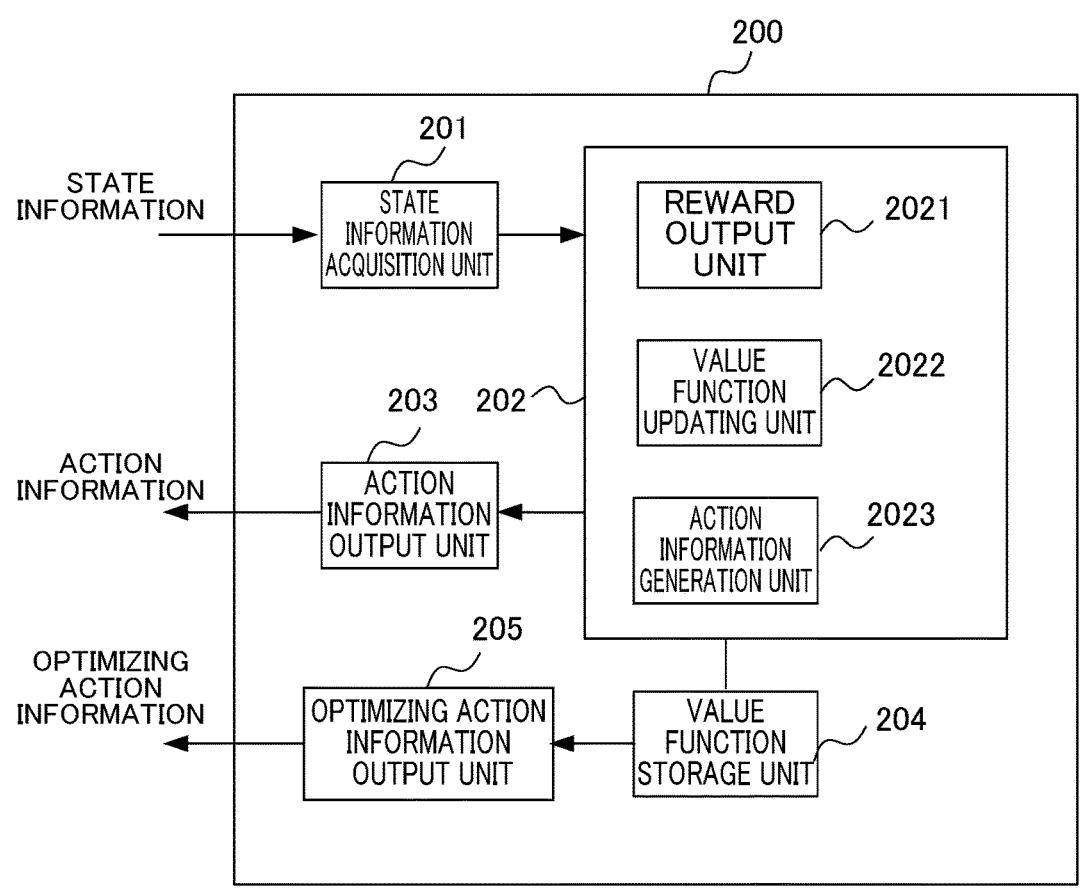
FIG. 10 is a block diagram showing a machine learning device of the first embodiment.

FIG. 10 is a block diagram showing the machine learning device 200 of the first embodiment of the present invention. In order to perform the reinforcement learning described above, as shown in FIG. 10, the machine learning device 200 includes the state information acquisition unit 201, a learning unit 202, the action information output unit 203, a value function storage unit 204, and an optimizing action information output unit 205.

The state information acquisition unit 201 acquires a state S including the servo state such as the command and the feedback, including the position error information of the servo motor control device 100 acquired by executing the evaluation program, from the servo motor control device 100 on the basis of the compensation coefficients c, d of the non-linear friction compensator 111 in the servo control device 100. This state information S corresponds to the environmental state S in the Q-learning. The state information acquisition unit 201 outputs the acquired state information S to the learning unit 202. A user creates in advance, the compensation coefficients c, d of the non-linear friction compensator 111 at the time when the Q-learning starts for the first time. In the present embodiment, initial set values of the compensation coefficients c, d of the non-linear friction compensator 111, created by the user is adjusted to be more optimal value by the reinforcement learning.

The learning unit 202 is a unit that learns the value function Q (S, A) of when an action A is selected under an environmental state S. Particularly, the learning unit 202 includes the reward output unit 2021, the value function updating unit 2022, and the action information generation unit 2023.

The reward output unit 2021 is a unit that calculates the reward of when the action A is selected under a state S. A set of position error (position error set) that is a state variable number in the state S is represented by PD(S), and a position error set that is a state variable number related to state information S' that has changed from the state S due to action information A (compensation of the compensation coefficients c, d of the non-linear friction compensator 111) is represented by PD(S'). A value of the position error in the state S is a value calculated on the basis of an evaluation function f (PD(S)) that is set in advance. As the evaluation function f, for example, a function of calculating an integrated value of an absolute value of the position error
∫|e|dt,
a function of calculating an integrated value by weighting the absolute value of the position error, with time
∫t|e|dt,
a function of calculating an integrated value of 2n-th (n is a natural number) power of the absolute value of the position error
∫$e^{2n}$dt (n is a natural number), or
a function of calculating the maximum value of the absolute value of the position error
Max{|e|}
may be applied. Note that the evaluation function is not limited thereto. It is sufficient that the evaluation function is a function of appropriately evaluating the position error value in the state S on the basis of the position error set PD(S).

When a value f(PD(S')) of the position error of the servo motor control device 100 that has operated by using the non-linear friction compensator 111 of after the correction related to the state information S' corrected by the action information A, is larger than the value f(PD(S)) of the position error value f of the servo motor control device 100 that has operated by using the non-linear friction compensator 111 of before the correction related to the state information S before the correction by the action information A, the reward output unit 2021 sets a reward value to be a negative value.

On the other hand, when the value f(PD(S')) of the position error of the servo motor control device 100 that has operated by using the non-linear friction compensator 111 of after the correction related to the state information S' corrected by the action information A, is smaller than the value f(PD(S)) of the position error of the servo motor control device 100 that has operated by using the non-linear friction compensator 111 of before the correction related to the state information S before the correction by the action information A, the reward output unit 2021 sets the reward value to be a positive value.

When the value f(PD(S')) of the position error of the servo motor control device 100 that has operated by using the non-linear friction compensator 111 of after the correction related to the state information S' corrected by the action information A, is equal to a value f(PD(S)) of the position error of the servo motor control device 100 that has operated by using the non-linear friction compensator 111 of before the correction related to the state information S before the correction by the action information A, the reward output unit 2021 sets the reward value to be zero, for example.

The negative value of when the value f(PD(S')) of the position error of the state S' after performing of the action A, is larger than the value f(PD(S)) of the position error in the prior state S, may be larger according to a ratio. That is, the negative value may be larger according to the degree of increasing of the value of the position error. On the contrary, the positive value of when the value f(PD(S')) of the position error of the state S' of after performing of the action A is smaller than the value f(PD(S)) of the position error in the prior state S, may be larger according to a ratio. That is, the positive value may be larger according to the degree of decreasing of the value of the position error.

The value function updating unit 2022 performs Q-learning on the basis of the state S, the action A, the state S' of when the action A is applied to the state S, and the reward value calculated as described above, to update a value function Q that the value function storage unit 204 stores. Updating of the value function Q may be performed by online learning, batch learning, or mini-batch learning.

The online learning is a learning method of applying an action A to the current state S to update the value function Q immediately every time when the state S makes a transition to a new state S'. The batch learning is a learning method of applying an action A to the current state S to repeat the transition of the state S to the new state S' to collect learning data and perform updating of the value function Q by using all the collected learning data. Further, the mini-batch learning is an intermediate learning method between the online learning and the batch learning, and is a learning method of performing updating of the value function Q every time when certain pieces of learning data are accumulated.

The action information generation unit 2023 selects the action A in a process of the Q-learning, with respect to the current state S. The action information generation unit 2023 generates the action information A in order to cause operation (corresponding to the action A in the Q-learning) of correcting each of the compensation coefficients c, d of the non-linear friction compensator 111 of the servo motor control device 100 in the process of the Q-learning to be performed, to output the generated action information A to the action information output unit 203. More particularly, the action information generation unit 2023, for example, causes incremental adding or subtracting of each of the compensation coefficients c, d of the non-linear friction compensator 111 included in the action A with respect to each of the compensation coefficients of the non-linear friction compensator 111 included in the state S.

When increasing or decreasing of each of the compensation coefficients c, d of the non-linear friction compensator 111 is applied, a transition is made to the state S', and a positive reward (reward of a positive value) is given, the action information generation unit 2023 may take, as the next action A', a measure of selecting the action A' such that the value of the position error becomes smaller, such as incremental adding or subtracting as similar to the previous action, with respect to each of the compensation coefficients c, d of the non-linear friction compensator 111.

On the contrary, when a negative reward (reward of a negative value) is given, the action information generation unit 2023 may take, as the next action A', for example, a measure of selecting the action A' such that the position error is smaller than the previous value, such as incremental subtracting or adding on the contrary to the previous action, with respect to each of the compensation coefficients c, d of the non-linear friction compensator 111.

The action information generation unit 2023 may take a measure of selecting the action A' by a known method such as the greedy method of selecting the action A' having the highest value function Q (S, A) from among values of the action A currently estimated, or the ε greedy method of randomly selecting the action A' with a small probability ε, and other than that, selecting the action A' having the highest value function Q (S, A).

The action information output unit 203 is a unit that transmits the action information A output from the learning unit 202 to the servo motor control device 100. As described above, the servo motor control device 100 slightly corrects the current state S, that is, each of the compensation coefficients c, d of the non-linear friction compensator 111 that are currently set on the basis of the action information, to make a transition to the next state S' (that is, the corrected compensation coefficients of the non-linear friction compensator 111).

The value function storage unit 204 is a storage device that stores the value function Q. The value function Q may be stored in a table (hereinafter, referred to as an action value table) for example, for every state S and every action A. The value function Q stored in the value function storage unit 204 is updated by the value function updating unit 2022. The value function Q stored in the value function storage unit 204 may be shared with the other machine learning devices 200. When the value function Q is shared among a plurality of machine learning devices 200, distributed reinforcement learning can be performed by the machine learning devices 200. Thus, efficiency of the reinforcement learning can be improved.

The optimizing action information output unit 205 creates the action information A (hereinafter, referred to as "optimizing action information") for causing the non-linear friction compensator 111 to perform operation with which the value function Q (S, A) is the maximum, on the basis of the value function Q updated by performing the Q-learning by the value function updating unit 2022. More particularly, the optimizing action information output unit 205 acquires the value function Q stored in the value function storage unit 204. This value function Q is updated by performing the Q-learning by the value function updating unit 2022 as described above. Then, the optimizing action information output unit 205 creates the action information on the basis of the value function Q to output the created action information to the servo motor control device 100 (the non-linear friction compensator 111). This optimizing action information includes information of correcting each of the compensation coefficients c, d of the non-linear friction compensator 111, as similar to the action information output in the process of the Q-learning by the action information output unit 203.

In the servo motor control device 100, each of the compensation coefficients c, d of the non-linear friction compensator 111 are corrected on the basis of this action information. Accordingly, the servo motor control device 100 can operate to reduce the value of the position error. As described above, by utilizing the machine learning device 200 according to the present invention, the parameter adjustment of the non-linear friction compensator 111 of the servo motor control device 100 is simplified.

The function blocks included in the servo motor control device 100, and the machine learning device 200 have been described above. In order to realize these function blocks, each of the servo motor control device 100 and the machine learning device 200 include an operation processing device such as a central processing unit (CPU). Each of the servo motor control device 100 and the machine learning device 200 also include a sub storage device such as a hard disk drive (HDD) stored with various control programs such as application software and an operating system (OS), and a main storage device such as a random access memory (RAM) for storing data temporarily required for execution of the program by the operation processing device.

In each of the servo motor control device 100 and the machine learning device 200, while reading the application software and the OS from the sub storage device, and decompressing the read application software and OS into the main storage device, the operation processing device performs operation processing based on these application software and OS. On the basis of this operation result, various hardware included in each device is controlled. Thereby, the function blocks of the present embodiment are realized. That is, the present embodiment can be realized by cooperation of the hardware and the software.

The machine learning device 200 performs a large amount of operation associated with the machine learning. Thus, it is desirable that, for example, a personal computer is mounted with graphics processing units (GPUs), and the GPUs are utilized for the operation processing associated with the machine learning by a technique called general-purpose computing on graphics processing units (GPGPU). The machine learning device 200 can perform high speed processing by utilizing the GPU. Further, in order to perform higher speed processing, a plurality of such computers mounted with the GPU may be used to construct a computer cluster, so that the machine learning device 200 performs parallel processing by the plurality of computers included in the computer cluster.

Figure 11:
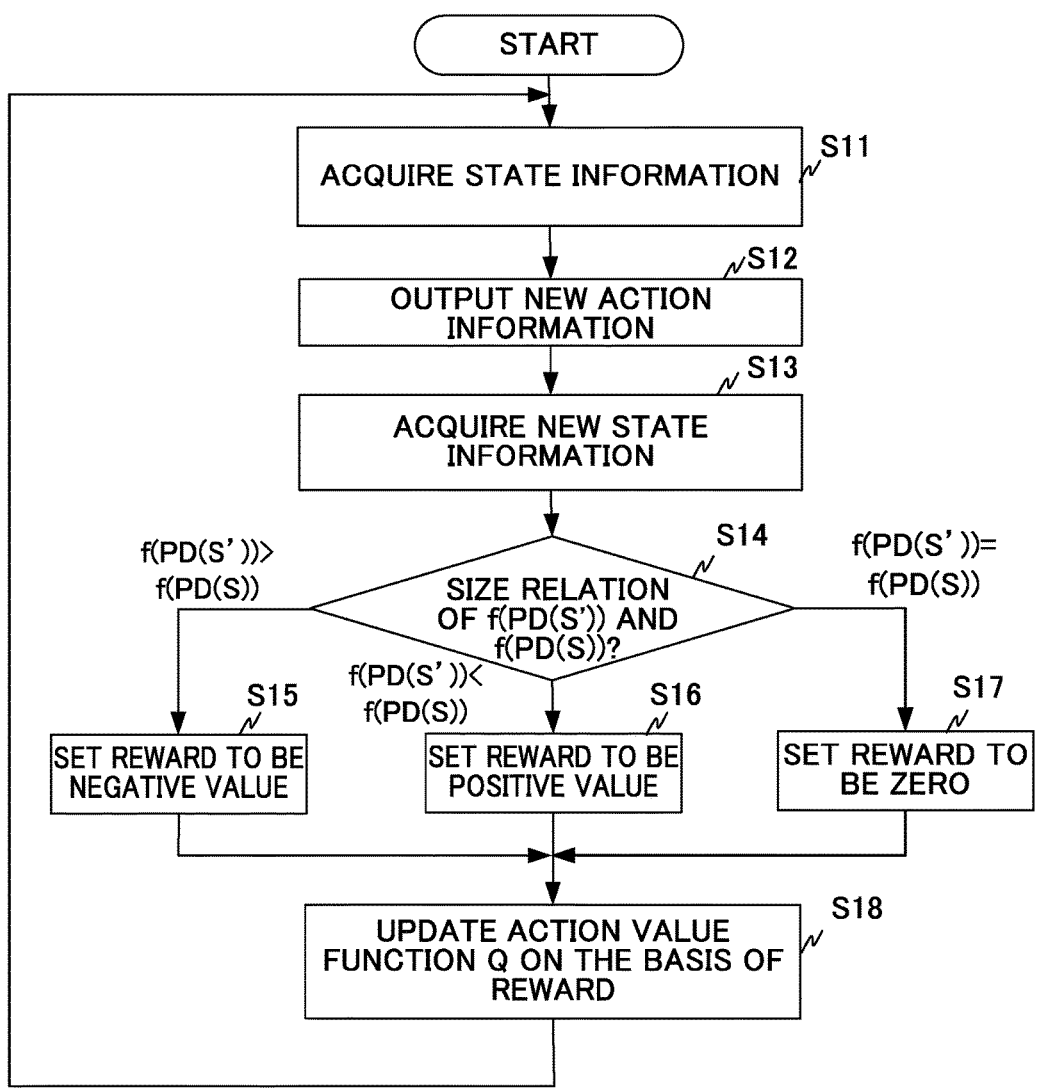
FIG. 11 is a flowchart explaining motion of the machine learning device.

Next, operation of the machine learning device 200 at the time of Q-learning in the present embodiment will be described with reference to a flowchart of FIG. 11. A case where the geometry is a circle is described here. However, the geometry may be a square, and the machine learning device 200 may learn sequentially cases where the geometry is a circle, a square, and the like.

In step S11, the state information acquisition unit 201 acquires the state information S from the servo motor control device 100. The acquired state information is output to the value function updating unit 2022 and the action information generation unit 2023. As described above, this state information S is information corresponding to a state in the Q-learning, and includes each of the compensation coefficients c, d of the non-linear friction compensator 111 of at the time of step S11. In this way, a set PD(S) of the position error corresponding to the geometry that is a circle of when the compensation coefficients are initial values, is obtained from the non-linear friction compensator 111.

As described above, the coefficients c, d of the non-linear friction compensator 111 in the initial state $S_0$ are, initially set by a user.

The value $PD(S_0)$ of the position error in the state $S_0$ of when the Q-learning starts for the first time, is obtained from the subtractor 102 by operating the servo motor control device 100 by the evaluation program. The position command creation unit 101 sequentially outputs the position command in a circle geometry specified by the evaluation program. The position command value corresponding to the geometry that is a circle is output from the position command creation unit 101, and the subtractor 102 outputs a difference between the position command value, and a detection position output from the integrator 108, to the machine learning device 200, as the position error $PD(S_0)$.

In step S12, the action information generation unit 2023 generates new action information A, to output the generated new action information A to the servo motor control device 100 via the action information output unit 203. The action information generation unit 2023 outputs the new action information A on the basis of the measure described above. The servo motor control device 100 that has received the action information A drives the machining tool including the servo motor, by the state S' in which each of the compensation coefficients c, d of the non-linear friction compensator 111 related to the current state S are corrected on the basis of the received action information. As described above, this action information corresponds to the action A in the Q-learning.

In step S13, the state information acquisition unit 201 acquires the position error PD(S') in the new state S' from the subtractor 102, and the compensation coefficients c, d from the non-linear friction compensator 111. In this way, the state information acquisition unit 201 acquires the set PD(S') of the position error corresponding to the geometry that is a circle, of when compensation coefficients are the compensation coefficients c, d in the state S', from the non-linear friction compensator 111. The acquired state information is output to the reward output unit 2021.

In step S14, the reward output unit 2021 determines size relationship between the value f(PD(S')) of the position error in the state S', and the value f(PD(S)) of the position error in the state S. When it is f(PD(S'))>f(PD(S)), the reward output unit 2021 sets the reward to be a negative value in step S15. When it is f(PD(S'))<f(PD(S)), the reward output unit 2021 sets the reward to be a positive value, in step S16. When it is f(PD(S'))=f(PD(S)), the reward output unit 2021 sets the reward to be zero in step S17. The reward output unit 2021 may perform weighting with respect to the negative value and the positive value of the reward.

When any of step S15, step S16, and step S17 ends, the value function updating unit 2022 updates the value function Q stored in the value function storage unit 204 on the basis of the reward value calculated in any of these steps, in step S18. Then, processing returns to step S11 again, and processing described above is repeated. Thereby, the value function Q settles to a suitable value. The processing described above may end with a condition of being repeated for a predetermined number of times, or being repeated for predetermined time. Although online updating is exemplified for step S18, batch updating or mini batch updating may be performed instead of the online updating.

As described above, by the operation described with reference to FIG. 11, the present embodiment exhibits an effect capable of obtaining a suitable value function for adjustment of the compensation coefficients c, d of the non-linear friction compensator 111 by utilizing the machine learning device 200, to simplify optimization of the compensation coefficients c, d of the feedforward. Next, operation at the time of generation of optimizing action information by the optimizing action information output unit 205 will be described with reference to a flowchart of FIG. 12. First, in step S21, the optimizing action information output unit 205 obtains the value function Q stored in the value function storage unit 204. The value function Q has been updated by performing of the Q-learning by the value function updating unit 2022 as described above.

In step S22, the optimizing action information output unit 205 generates the optimizing action information on the basis of the value function Q, to output the generated optimizing action information to the non-linear friction compensator 111 of the servo motor control device 100.

Figure 12:
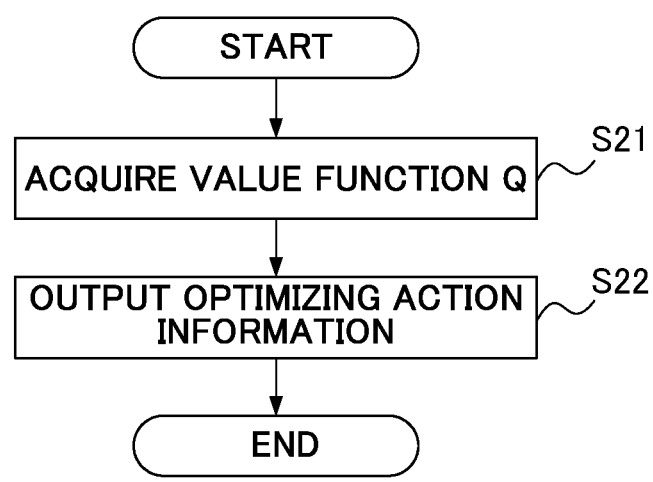
FIG. 12 is a flowchart explaining motion of an optimizing action information output unit of the machine learning device.

By operation described with reference to FIG. 12, in the present embodiment, the optimizing action information is generated on the basis of the value function Q determined by learning by the machine learning device 200, and adjustment of the compensation coefficient c, d of the non-linear friction compensator 111 currently set by the servo motor control device 100 can be simplified, on the basis of the optimizing action information, and the value of the position error can be reduced.

Figure 13:
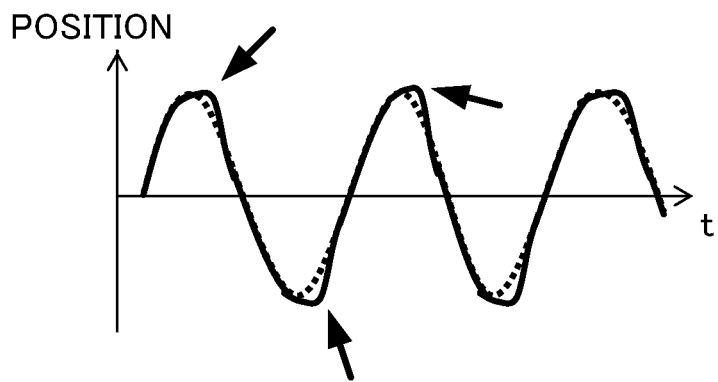
FIG. 13 is a diagram showing a movement path of the table before parameter adjustment of a non-linear friction compensator by machine learning.
Figure 14:
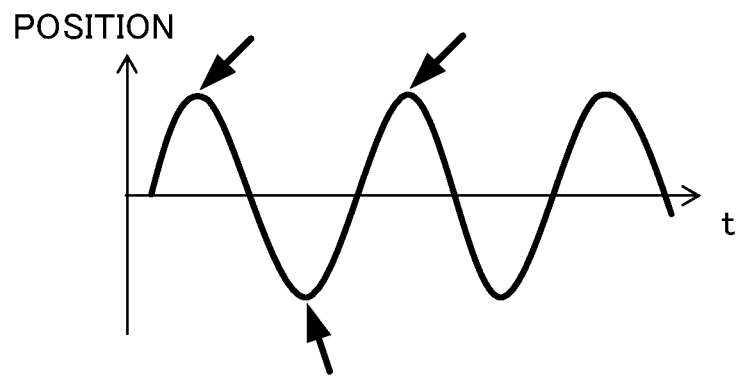
FIG. 14 is a diagram showing a movement path of the table after the parameter adjustment of the non-linear friction compensator by the machine learning.

Effects by the machine learning device of the present embodiment will be described below with reference to FIG. 13 and FIG. 14. FIG. 13 is a diagram showing a movement path of the table before parameter adjustment of a non-linear friction compensator by the machine learning. FIG. 14 is a diagram showing a movement path of the table after the parameter adjustment of the non-linear friction compensator by the machine learning. Both FIG. 13 and FIG. 14 show a movement path of when the table included in the control target moves in a sine-wave shape in the X axis direction or the Y axis direction as shown in FIG. 5. As shown in FIG. 13, before the parameter of the non-linear friction compensator 111 is adjusted by the machine learning, when the rotation direction of the servo motor attempts to invert, inversion delay occurs as the movement path shown by a solid line, with respect to the movement path of the table of the sine-wave shape shown by a dotted line. This inversion delay occurs due to non-linear friction, and the table does not instantly invert and move. As shown in FIG. 14, after the parameter of the non-linear friction compensator 111 is adjusted by the machine learning, the inversion delay due to the non-linear friction is removed, and the table moves in the movement path of the sine-wave shape as shown by the solid line. Arrows in FIG. 13 and FIG. 14 show inversion positions.

As shown in FIG. 6, even when the table included in the control target moves in a triangular-wave shape in the X axis direction or the Y axis direction, before the parameter of the non-linear friction compensator 111 is adjusted by the machine learning, as similar to when the table moves in the sine-wave shape, the inversion delay due to the non-linear friction occurs when the rotation direction of the servo motor attempts to invert. That is, the inversion delay due to the non-linear friction occurs with respect to the movement path of the table of the triangular wave shape, that is set in the position command creation unit 101, and the table does not instantly invert and move. However, after the parameter of the non-linear friction compensator 111 is adjusted by the machine learning, the inversion delay due to the non-linear friction is removed, and the table moves in the movement path of the triangular-wave shape.

The servo motor control unit of the servo motor control device described above, and each of components included in the machine learning device may be realized by hardware, software or combination thereof. The servo motor control method performed by cooperation of each of the components included in the servo motor control device described above, also may be realized by hardware, software, or combination thereof. Being realized by software means being realized by reading and executing a program by a computer.

The program may be stored by using various types of non-transitory computer readable media, and supplied to the computer. The non-transitory computer readable media include various types of tangible storage media. Examples of the non-transitory computer readable media include a magnetic recording medium (for example, a hard disk drive), a magneto-optical recording medium (for example, a magneto-optical disk), a CD-ROM (read only memory), a CD-R, a CD-R/W, a semiconductor memory (for example, a mask ROM, a programmable ROM (PROM), an erasable PROM (EPROM), a flash ROM, and a random access memory (RAM).

Although the embodiment described above is a preferable embodiment of the present invention, the scope of the present invention is not limited thereto. The present invention may be performed in an embodiment in which various modifications are performed without departing from the scope of the present invention.

<When Velocity Feedforward Calculation Unit 110 is Set to be Option>

In the embodiments described above, the servo motor control device 100 is described as including the velocity feedforward calculation unit 110, and having a configuration in which the non-linear friction compensator 111 is connected in parallel to the velocity feedforward calculation unit 110, but not limited to this. The velocity feedforward calculation unit 110 may be an option, and the servo motor control device 100 may not include the velocity feedforward calculation unit 110.

<Modification in which Servo Motor Control Device Includes Machine Learning Device>

In the embodiments described above, the machine learning device 200 is a device that is different from the servo motor control device 100. Part or all of the function of the machine learning device 200 may be realized by the servo motor control device 100. That is, the servo motor control device 100 may include the machine learning device 200.

<Degree of Freedom of System Configuration>

In the embodiment described above, the machine learning device 200 and the servo motor control device 100 are communicatively connected as a set of one-to-one. However, for example, one machine learning device 200 is communicatively connected with a plurality of servo motor control devices 100 via the network 400 to perform machine learning of each of the servo motor control devices 100. At that time, respective functions of the machine learning device 200 may be realized by a distributed processing system in which the functions are distributed in a plurality of servers, as appropriate. The functions of the machine learning device 200 may be realized by utilizing a virtual server function, or the like, in a cloud. When there are a plurality of machine learning devices 200-1 to 200-n corresponding to a plurality of servo motor control devices 100-1 to 100-n, respectively, of the same type name, the same specification, or the same series, the servo motor control system may be configured to share learning results in the machine learning devices 200-1 to 200-n. Thereby, more optimal model can be constructed.

EXPLANATION OF REFERENCE NUMERALS

10 Servo motor control system
100 Servo motor control device
101 Position command creation unit
102 Subtractor
103 Position control unit
104 Adder
105 Subtractor
106 Velocity control unit
107 Adder
108 Integrator
109 Position feedforward calculation unit
110 Velocity feedforward calculation unit
111 Non-linear friction compensator
200 Machine learning device
201 State information acquisition unit
202 Learning unit
203 Action information output unit
204 Value function storage unit
205 Optimizing action information output unit
300 Control target
400 Network

What is claimed is:

1. A machine learning device configured to perform machine learning with respect to a servo motor control device comprising a non-linear friction compensation unit configured to create a compensation value with respect to non-linear friction on the basis of a position command, the machine learning device comprising:
a state information acquisition unit configured to acquire state information from the servo motor control device by causing the servo motor control device to execute a predetermined program, the state information including a servo state including at least position error, and a combination of compensation coefficients of the non-linear friction compensation unit;
an action information output unit configured to output action information including adjustment information of the combination of compensation coefficients included in the state information, to the servo motor control device;
a reward output unit configured to output a reward value in reinforcement learning, based on the position error included in the state information; and
a value function updating unit configured to update an action value function on the basis of the reward value output by the reward output unit, the state information, and the action information.

2. The machine learning device according to claim 1, wherein the reward output unit outputs the reward value on the basis of an absolute value of the position error.

3. The machine learning device according to claim 1, wherein the servo motor control device further comprises a velocity feedforward calculation unit configured to create a velocity feedforward value on the basis of the position command, and the non-linear friction compensation unit is connected in parallel to the velocity feedforward calculation unit.

4. The machine learning device according to claim 1, wherein the machine learning device further includes an optimizing action information output unit configured to generate and output combination of compensation coefficients of the non-linear friction compensation unit, on the basis of a value function updated by the value function updating unit.

5. A servo motor control system comprising: the machine learning device according to claim 1; and a servo motor control device that comprises a non-linear friction compensation unit configured to create a compensation value with respect to non-linear friction.

6. The servo motor control system according to claim 5, wherein the servo motor control device further comprises a velocity feedforward calculation unit configured to create a velocity feedforward value on the basis of a position command, and the non-linear friction compensation unit is connected in parallel to the velocity feedforward calculation unit.

7. A servo motor control device comprising: the machine learning device according to claim 1; and a non-linear friction compensation unit configured to create a compensation value with respect to non-linear friction.

8. The servo motor control device according to claim 7, wherein the servo motor control device further comprises a velocity feedforward calculation unit configured to create a velocity feedforward value on the basis of a position command, and the non-linear friction compensation unit is connected in parallel to a velocity feedforward calculation unit.

9. A machine learning method of a machine learning device configured to perform machine learning with respect to a servo motor control device, comprising a non-linear friction compensation unit configured to create a compensation value with respect to non-linear friction on the basis of a position command, the machine learning method comprising:
acquiring state information from the servo motor control device by causing the servo motor control device to execute a predetermined program, the state information including a servo state including at least position error, and a combination of compensation coefficients of the non-linear friction compensation unit;
outputting action information including adjustment information of the combination of compensation coefficients included in the state information, to the servo motor control device; and
updating action value function on the basis of a reward value in reinforcement learning, the state information, and the action information based on the position error included in the state information.

\* \* \* \* \*